United States Patent [19]
Rubinstein et al.

[11] Patent Number: 5,108,573
[45] Date of Patent: Apr. 28, 1992

[54] MORPHOLOGY IN ELECTROCHEMICALLY GROWN CONDUCTING POLYMER FILMS

[75] Inventors: Israel Rubinstein, Rishon-Letzion, Israel; Shimshon Gottesfeld, Los Alamos, N. Mex.; Eyal Sabatani, Rehovot, Israel

[73] Assignee: The United States of America as represented by the United States Department of Energy, Washington, D.C.

[21] Appl. No.: 533,551

[22] Filed: Jun. 5, 1990

[51] Int. Cl.$^5$ .......................... C25B 11/00; H01M 4/60
[52] U.S. Cl. ............................... 204/290 R; 204/59 R; 429/213
[58] Field of Search .......................... 204/59 R, 290 R; 429/213

[56] References Cited

U.S. PATENT DOCUMENTS

| | | | |
|---|---|---|---|
| 4,442,187 | 4/1984 | MacDiarmid et al. | 429/213 |
| 4,476,003 | 10/1984 | Frank et al. | 204/290 F |
| 4,539,061 | 9/1985 | Sagiv | 156/278 |
| 4,964,972 | 10/1990 | Sagiv et al. | 204/418 |

OTHER PUBLICATIONS

Sabatani et al., "Organized Self-Assembling Monolayers on Electrodes Part I Octadecyl Derivatives on Gold", J. Electroanal. Chem., 219 (1987) pp. 365-371.
E. Sabatani et al., "Organized Self-Assembling Monolayers on Electrodes. 2. Monolayer-Based Ultramicroelectrodes for the Study of Very Rapid Electrode Kinetics," 91 J. Phys. Chem., pp. 6663-6669 (1987).

Primary Examiner—John Niebling
Assistant Examiner—Steven P. Marquis
Attorney, Agent, or Firm—Ray G. Wilson; Paul D. Gaetjens; William R. Moser

[57] ABSTRACT

A conducting polymer film with an improved space filling is formed on a metal electrode surface. A self-assembling monolayer is formed directly on the metal surface where the monolayer has a first functional group that binds to the metal surface and a second chemical group that forms a chemical bonding site for molecules forming the conducting polymer. The conducting polymer is then conventioonally deposited by electrochemical deposition. In one example, a conducting film of polyaniline is formed on a gold electrode surface with an intermediate monolayer of p-aminothiophenol.

2 Claims, 2 Drawing Sheets p-aminothiophenol

3-[3-thio-propyl]-thiophere

3-[2-thio-ethyl]-thiophere

3-[2-thio-ethyl]-pyrrole

3-[2-iodo-ethyl]-pyrrole

MORPHOLOGY IN ELECTROCHEMICALLY GROWN CONDUCTING POLYMER FILMS

This invention is the result of a contract with the Department of Energy (Contract No. W-7405-ENG-36).

BACKGROUND OF INVENTION

The invention relates to conducting polymer films and, more particularly, to conductive polymer films grown on metal substrates.

The development of electrically conducting polymers, such as polyaniline and polypyrrole, has advantageously provided coatings that can extend the applications of conductive metal and semiconductive substrates to environments that are harmful to these materials. However, it can be difficult to form a conducting polymer film with the desired adhesion and density on the substrate surface.

For semiconductor surfaces, conducting polymers are attached by modifying the semiconductor surface with a coupling reagent so that the polymer can covalently or coordinatively bond to the semiconductor surface. This process is set out in U.S. Pat. No. 4,476,003, "Chemical Anchoring of Organic Conducting Polymers to Semiconducting Surfaces," issued 10/9/84, to Frank et al. The resulting film provides a barrier to direct photodegradation or chemical degradation of the semiconductor substrate.

Conducting polymer films grown on metal substrate surfaces have generally been of low density, with concomitant relatively low electronic conductivity and/or low adhesion to the surface. Accordingly, it is an object of the present invention to provide an electrochemically grown conducting polymer film with improved adhesion and morphology on a metal substrate.

Another object of the invention is to provide a conducting polymer film with a high density on a metal substrate.

One other object is to increase the adhesion between the film and the metal substrate.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF INVENTION

To achieve the foregoing and other objects, and in accordance with the purposes of the present invention, as embodied and broadly described herein, this invention may comprise a method for forming a film of conducting polymer on a metal surface. A self-assembling monolayer is formed on the metal surface where the monolayer has a first functional group that is bound to the metal surface and a second functional group that forms a chemical bonding site for molecules forming said conducting polymer during subsequent electrochemical film deposition.

In another characterization of the present invention, a conductive electrode is formed, comprising a metal electrode, a conducting polymer film disposed above said metal electrode, and a self-assembling monolayer disposed therebetween, wherein the self-assembling monolayer has a first functional group that is bound to a contacting surface of the metal electrode and a second functional group oriented to chemically bond with said conducting polymer.

BRIEF DESCRIPTION OF THE DRAWING

The accompanying drawing, is incorporated in and forms a part of the specification, illustrates an embodiment of the present invention and, together with the description, serves to explain the principle of the invention. In the drawing.

DETAILED DESCRIPTION OF THE INVENTION

In accordance with the present invention, a metal surface is modified to provide an improved bonding site for molecules forming a conducting polymer film on the surface. A self-assembling monolayer is selected that has one functional group effective to bond onto the metal surface and second functional group that chemically bonds with the conducting polymer film. The material forming the monolayer is selected to (a) bond well to the metal surface through one end of the molecule, (b) form a complete monolayer by spontaneous molecular assembly, and (c) lower the energy of polymer/substrate interactions by providing chemical bonding sites for the polymer at the other end of the oriented molecule and/or rendering the surface "polymerophilic" and thus lowering the energies of the nucleation and lateral growth steps in the electrochemical process of conducting polymer film growth. The monolayer may also remove adsorbed surface contaminants that interfere with the process of polymer growth on a metal substrate. The resulting conducting polymer film is deposited on the modified surface with improved adhesion to the metal surface and a morphology resulting in a higher space filling, i.e., density, of the film. A protective film is thus formed having a high adhesion, high space filling, and low resistivity.

Suitable self-assembling monolayers include p-aminothiophenol (PATP) and other thio or halo groups where the thio or halo groups adsorb and/or bind onto conductive surfaces of metals, e.g., gold, platinum, or silver. The second functional groups of the monolayer provide the following chemical groups for binding with conducting polymer materials: amino group for bonding polymers of the polyaniline family, pyrrole units for bonding polymers of the polypyrrole family, thiophene for bonding polymers of the polythiophene family, etc.

The first functional group may be represented by 3-[thio alkyl]- or 3-[halo alkyl]- for compounding with a selected member of the second functional group. Possible compounds include the following:

3-[3-thio-propyl]-thiophene;
3-[2-thio-ethyl]-thiophene;
3-[2-thio-ethyl]-pyrrole;
3-[2-iodo-ethyl]-pyrrole.

Figure 1:
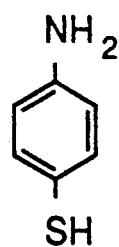
FIG. 1 illustrates structural formulas for possible monolayer materials.
Figure 1:
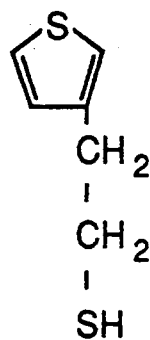
Figure 1:
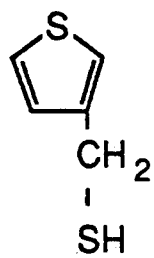
Figure 1:
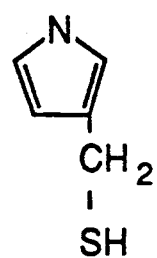
Figure 1:
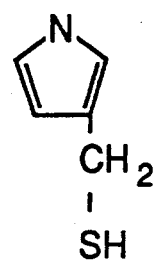

Structural formulas for these compounds are shown in FIG. 1, illustrating the separation of the first and second groups forming the oriented monolayer.

In one exemplary embodiment, a conductive film of polyaniline was formed on a gold substrate surface. A substrate surface was prepared by the following process:

1. A quartz disc was cleaned by rinsing with methanol, followed with water, and dried with a flow of nitrogen.
2. A thin layer of titanium (about 50 angstroms) was predeposited by sputter deposition to improve adhesion of the gold.
3. 1000 angstroms of gold film was sputter deposited on top of the titanium.
4. The gold surface was mildly plasma cleaned with oxygen for 1 minute.
5. The electrode was dipped in a solution of 0.001M PATP in 1:10 ether:bicyclohexyl solution overnight.
6. The electrode was washed with chloroform to remove excess solvent and dried under a flow of nitrogen. The PATP has a thio group that binds to the gold surface and the PATP molecules orient on the surface to provide bonding sites for the aniline radicals forming the polyaniline conducting film.

Polyaniline was then deposited electrochemically at a constant anodic current density of 1 microampere/cm$^2$ from an aqueous solution of 0.1 M aniline and 1M HClO$_4$.

Metal electrode surface is formed by vacuum sputtering gold onto a sputtered Ti layer on the quartz disk. Other possible conducting metals include silver, platinum, palladium, and nickel.

Figure 2:
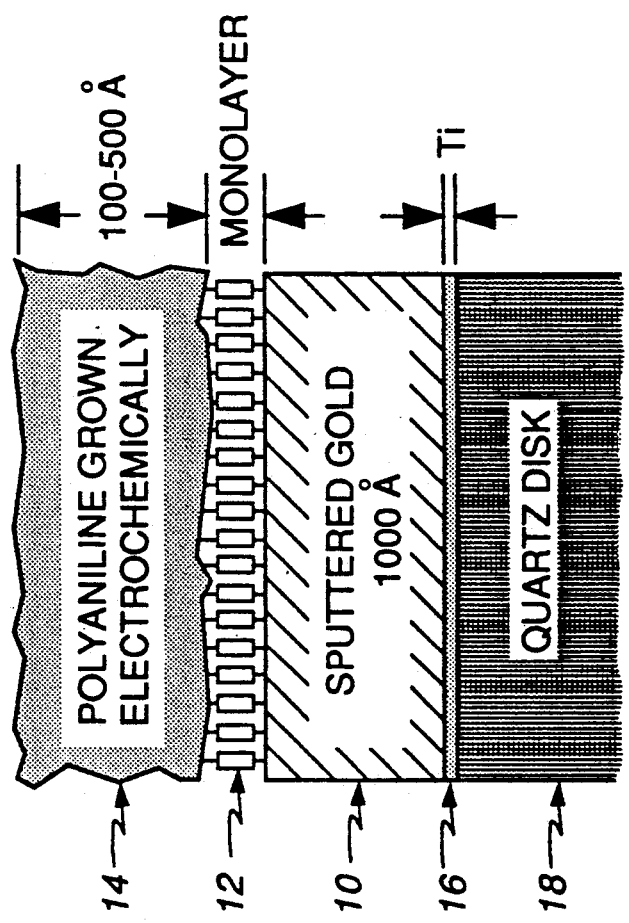
FIG. 2 is a cross-sectional schematic of one embodiment of the present invention.

The resulting electrode structure is schematically shown in FIG. 2. Self-assembling monolayer 12, illustrated as PATP, has one functional group, the thio group, bound to the metal surface 10. The application of monolayers to electrode surfaces is generally discussed in E. Sabatani et al., "Organized Self-Assembling Monolayers on Electrodes," 219 J. Electroanal. Chem., pp. 365-371 (1987). Monolayer 12 orients on the metal surface to provide a second functional group, the amino group, for bonding with a conducting polymer 14. The bonding sites provided by the monolayer 12 enable the conducting film to grow as a dense, adherent layer. The improved morphology effected by monolayer 12 has been observed in film thicknesses up to 500 angstroms.

The film morphology has been characterized in two ways: optical ellipsometry and microgravimetry. Two conducting films of polyaniline were deposited on gold surfaces, as described above, employing the same current density and duration of growth, where one of the films was formed without the PATP treatment. Table A characterizes the two films.

TABLE A

|  | Imaginary Component of Refractive Index | Density | Thickness (angstroms) |
| --- | --- | --- | --- |
| No Monolayer | 0.025 | 1.07–1.08 gm/cm$^3$ | 800 |
| Monolayer | 0.21 | 1.8–2.1 gm/cm$^3$ | 400 |

As illustrated in Table A, the film formed on the prebound monolayer had an optical absorption coefficient about eight times greater than the film formed on the untreated metal at the measurement wavelength (6000 angstroms). The increased density of the film is indicative of a greatly increased space filling of the polymer adjacent the metal electrode.

Thus, a substantial increase in conducting polymer film density can be achieved for electrochemically grown films by prebinding on the metal electrode surface a self-assembled monolayer having a first functional group for binding to the metal surface and a second functional group for binding to the growing polymer. The monolayer molecules bind well to the metal substrate and, in turn, facilitate and regulate the bonding between the modified metal surface and the growing phase of the conducting polymer. The beneficial effect obtained on film morphology is believed to be caused by a more uniform and efficient nucleation and growth process of the polymer on the treated metal surface, resulting in a film with significantly improved space filling.

The foregoing description of embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electrode including a conducting polymer film, comprising:
    a conducting metal surface selected from the group consisting of gold, silver, platinum, palladium, and nickel;
    a self-assembling monolayer formed on said metal surface having a first functional group selected from the group consisting of thio and halo compounds for bonding to said surface and a second functional group for bonding with molecules forming said conducting polymer film; and
    a conducting polymer film electrochemically grown on said monolayer adjacent said metal surface.
2. An electrode according to claim 1, where said conducting polymer film is selected from the group consisting of polyaniline, polypyrrole, and polythiophene for bonding to said second functional group selected from the group consisting of amino, pyrrole, and thiophene, respectively, of said monolayer.

* * * * *